(12) United States Patent
Stretch

(10) Patent No.: US 6,634,344 B2
(45) Date of Patent: Oct. 21, 2003

(54) CONTROLLED ENGAGEMENT OF SUPERCHARGER DRIVE CLUTCH

(75) Inventor: Dale A. Stretch, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/021,465

(22) Filed: Oct. 30, 2001

(65) Prior Publication Data

US 2003/0079727 A1 May 1, 2003

(51) Int. Cl.$^7$ ................................................ F02B 33/00
(52) U.S. Cl. ..................... 123/559.3; 123/564; 192/21.5
(58) Field of Search ............................... 123/559.3, 564; 60/609; 192/21.5, 84.31, 84.951, 84.96

(56) References Cited

U.S. PATENT DOCUMENTS

| | | | | |
|---|---|---|---|---|
| 2,709,507 A | * | 5/1955 | Trickey ....................... 192/21.5 |
| 4,730,457 A | * | 3/1988 | Yamada et al. ................ 60/609 |
| 5,133,326 A | | 7/1992 | Nishimura et al. ......... 123/559.3 |
| 5,150,693 A | * | 9/1992 | Ohnaka et al. ............ 123/559.3 |
| 5,154,155 A | * | 10/1992 | Ohnaka et al. .............. 123/564 |
| 5,307,783 A | * | 5/1994 | Satoya et al. ............. 123/559.3 |
| 5,469,947 A | * | 11/1995 | Anzai et al. ................ 192/21.5 |
| 5,551,546 A | * | 9/1996 | Tabayama et al. ......... 192/84.96 |
| 5,564,400 A | | 10/1996 | Nishimura et al. ........ 123/559.3 |
| 5,791,039 A | * | 8/1998 | Tabuchi et al. ........... 192/84.31 |
| 5,996,759 A | * | 12/1999 | Aoki et al. ............. 192/84.951 |
| 6,289,882 B1 | * | 9/2001 | Slicker ..................... 123/559.3 |
| 6,290,043 B1 | * | 9/2001 | Ginder et al. .............. 192/21.5 |
| 6,394,244 B1 | * | 5/2002 | Dwivedi et al. ............ 192/21.5 |

FOREIGN PATENT DOCUMENTS

| | | | | |
|---|---|---|---|---|
| EP | 0 573 079 A2 | * | 12/1993 | ................ 192/21.5 |
| JP | 403156124 A | * | 7/1991 | .............. 123/559.3 |
| JP | 404086328 A | * | 3/1992 | |

* cited by examiner

Primary Examiner—Thomas Denion
Assistant Examiner—Thai-Ba Trieu
(74) Attorney, Agent, or Firm—Rader, Fishman & Grauer PLLC

(57) ABSTRACT

The present invention provides a control system and method of controlling a supercharger having an input and a pair of rotors. The method comprises providing a magnetic particle clutch having an input member, an output member and a source of magnetic flux. In the presence of a magnetic field, a magnetically reactive medium disposed between the input and output members is transformed into a torque transmitting coupling that causes the clutch to transition from a disengaged state to an engaged state. The method includes sensing a vehicle parameter and generating a signal operable to engage the clutch in response to the sensed vehicle parameter, so that the transition to the engaged state may be controlled as a function of the sensed vehicle parameter.

27 Claims, 8 Drawing Sheets

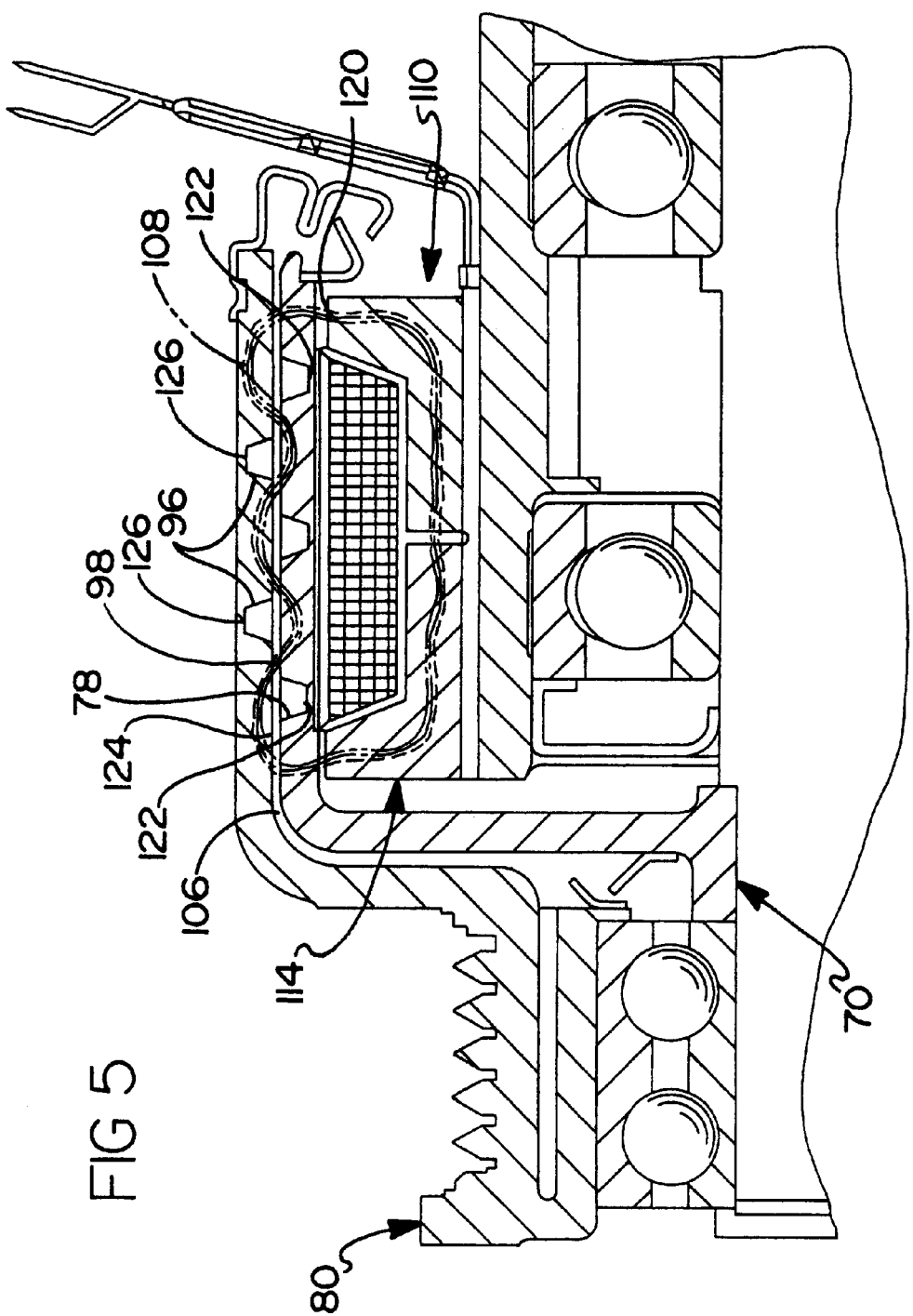

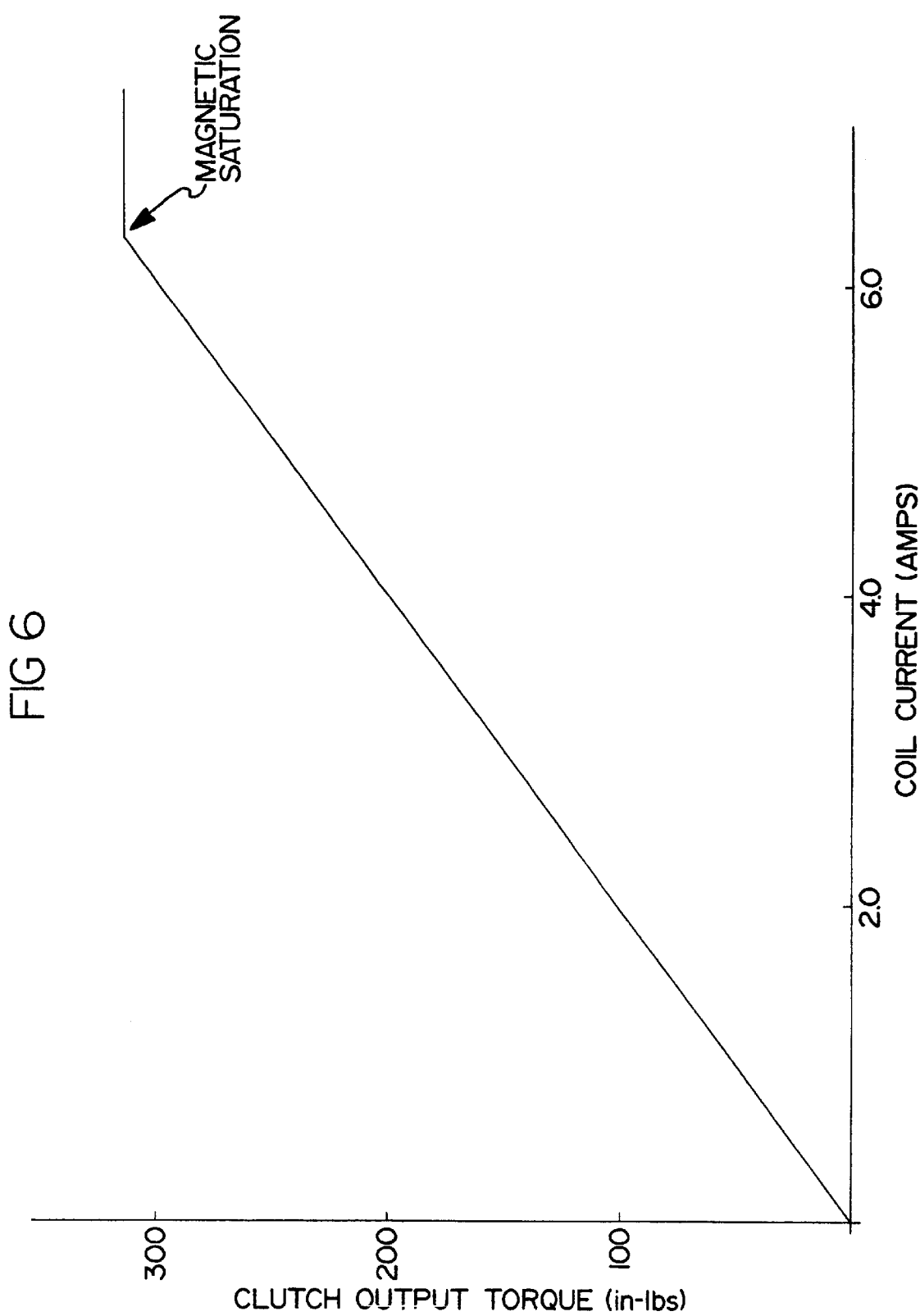

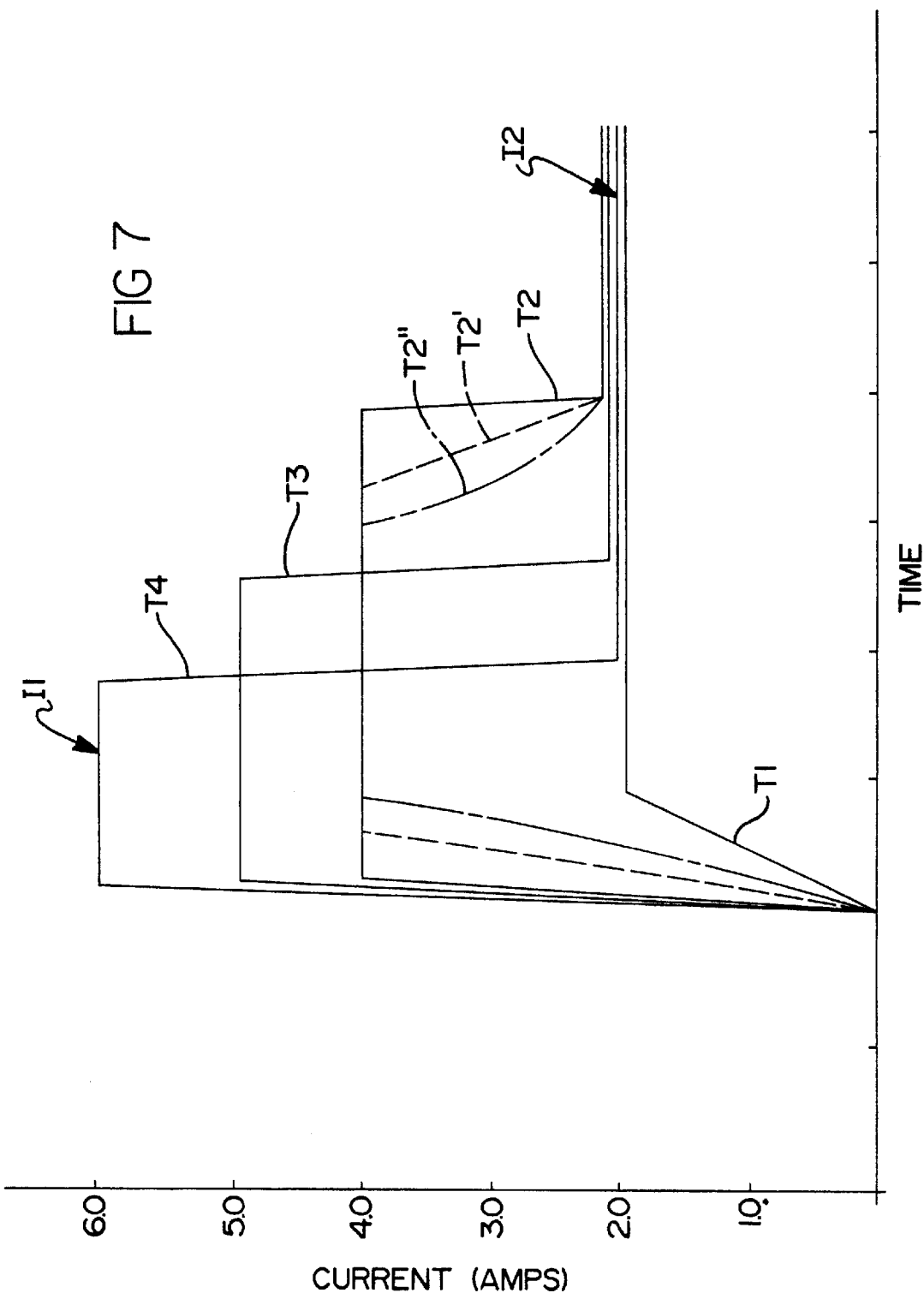

CONTROLLED ENGAGEMENT OF SUPERCHARGER DRIVE CLUTCH

FIELD OF THE INVENTION

The present invention relates generally to a magnetic particle clutch and more particularly, to a method of controlling operation of a magnetic particle clutch drivingly connected to a rotary blower, such as a supercharger, for supercharging an internal combustion engine.

BACKGROUND OF THE INVENTION

As is well known to those skilled in the art, the use of a supercharger to increase or "boost" the air pressure in an intake manifold of an internal combustion engine results in an engine having a greater horsepower output capability than would occur if the engine were normally aspirated (i.e., if the piston drew air into the cylinder during the intake stroke of the piston). Conventional superchargers are normally driven by an engine, and therefore, represent a drain on engine horsepower when engine boost is not required. For at least this reason, it is known to provide an engageable/disengageable device, such as a clutch, in series between an input (e.g., a belt driven pulley) and a supercharger.

By way of example only, a typical engagement time of a clutch driven supercharger, as specified by a vehicle manufacturer, is about 0.10 seconds. A substantially longer response time would result in the well known "turbo lag" feeling characterized by a time lag between depression of a vehicle accelerator and a point when supercharger boost becomes noticeable, as is inherent in a turbo charger type of engine boost system. On the other hand, response time should not be so fast (when engaging) and so sudden as to result in a large torque spike being imposed upon the engine.

It is well known in the art to provide a supercharger driven by a clutch assembly that operates electromagnetically. Although a supercharger with such a clutch arrangement can operate in a generally satisfactory manner once the clutch is in either the engaged or disengaged state, the known arrangement exhibits certain limitations during "transient" conditions, i.e., as the clutch assembly changes from the disengaged to the engaged state, or vice versa. Electromagnetic clutch driven superchargers are typically ON-OFF type devices that engage abruptly with little or no slipping of the clutch, which results in an undesirable transient load torque on the engine during engagement of the clutch. Depending on the engine speed, as a conventional electromagnetic clutch is engaged, a resulting "droop" in engine speed may be perceived by a driver of the vehicle and may be manifested as an undesirable slowing of the vehicle.

SUMMARY OF THE INVENTION

The present invention overcomes the limitations of conventional electromagnetic clutch driven superchargers by providing an improved method and control system for controlling a rotary blower having an input and a pair of blower rotors adapted to be driven by the input.

In accordance with an embodiment of the present invention, the method comprises providing a magnetic particle clutch in series driving relationship between the input and the blower rotors. The magnetic particle clutch includes an input member, an output member and a source of magnetic flux. In the presence of a magnetic field, a magnetically reactive medium disposed between the input and output members is transformed into a torque transmitting coupling that causes the clutch to transition from a disengaged state to an engaged state. The method includes sensing a vehicle parameter and generating a signal operable to engage the clutch in response to the sensed vehicle parameter so that the transition from the disengaged state to the engaged state may be controlled as a function of the sensed vehicle parameter.

A control system is also provided comprising a magnetic particle clutch as described above, at least one sensor for sensing a vehicle parameter, such as a rate of change in throttle position, and a control unit operable to selectively communicate a signal to the source of magnetic flux in response to the sensed vehicle operating parameter.

The present invention advantageously provides an improved supercharger and clutch assembly that exhibits both a variable and controllable engagement and disengagement response time, thus avoiding the ON-OFF characteristics of conventional electromagnetic clutch driven superchargers and the resulting transient overloading of the engine.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 5 is an enlarged cross-sectional view of the clutch of FIG. 3, showing lines of magnetic flux.

FIG. 6 is a graph of clutch output torque versus current for the clutch assembly shown in FIG. 3, according to a preferred embodiment of the present invention.

FIG. 7 is a graph of current versus time illustrating exemplary control strategies for engaging the clutch assembly shown in FIG. 3, according to a preferred embodiment of the present invention.

DESCRIPTION OF THE PREFERRED EMBODIMENT

Figure 1:
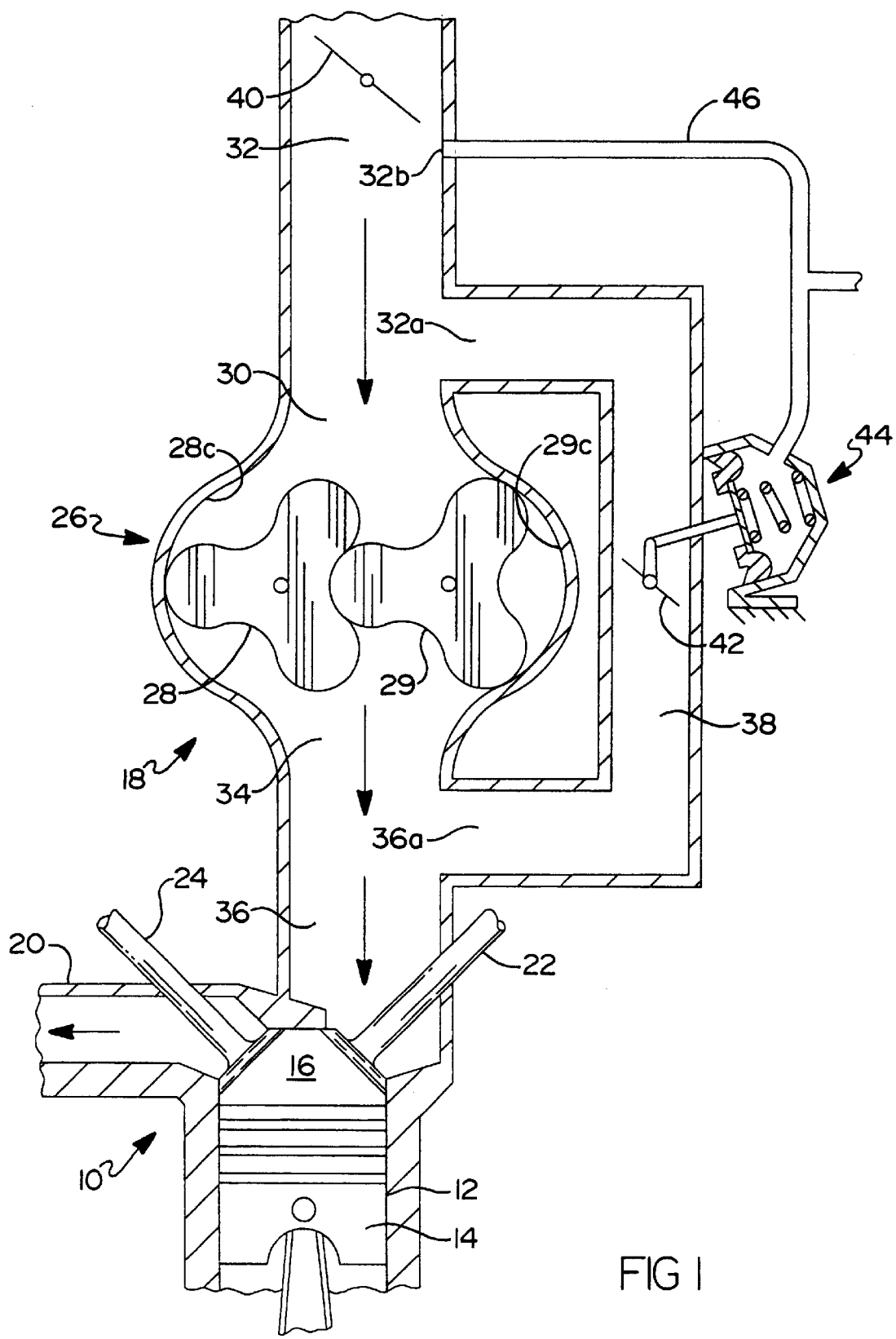
FIG. 1 is a schematic illustration of an intake manifold assembly having disposed therein a supercharger of a type that may be utilized in the present invention.

Referring now to the drawings, which are not intended to limit the invention, the preferred embodiments of the present invention are described in detail. FIG. 1 is a schematic illustration of an intake manifold assembly, including a supercharger and bypass valve arrangement. An engine, generally designated 10, includes a plurality of cylinders 12, and a reciprocating piston 14 disposed within each cylinder, thereby defining an expandable combustion chamber 16. The engine 10 includes intake and exhaust manifold assemblies 18 and 20, respectively, for directing combustion air to and from the combustion chamber 16, by way of intake and exhaust valves 22 and 24, respectively.

The intake manifold assembly 18 includes a positive displacement rotary blower 26 that may be of the Roots type, as illustrated and described in U.S. Pat. Nos. 5,078,583 and 5,893,355, which is owned by the assignee of the present invention and hereby incorporated by reference in their entirety, but is not necessarily limited thereto. Accordingly, the present invention may be used advantageously with superchargers having various rotor types and configurations, such as the male and female rotors found in screw compressors.

The blower 26 includes a pair of rotors 28 and 29, each of which includes a plurality of meshed lobes. The rotors 28 and 29 are disposed in a pair of parallel, transversely overlapping cylinder chambers 28c and 29c, respectively. The rotors 28, 29 may be driven mechanically by engine crankshaft torque transmitted thereto in a known manner, such as by means of a drive belt (not illustrated herein). In conventional supercharger assemblies, the mechanical drive rotates the blower rotors 28, 29 at a fixed ratio, relative to the crankshaft speed, such that the displacement of blower 26 is greater than the engine displacement, thereby boosting or supercharging the air flowing into combustion chamber 16.

The supercharger or blower 26 includes an inlet port 30, which receives air or an air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at 38. If the engine 10 is of the Otto-cycle type, a throttle valve 40 preferably controls air or air-fuel mixture flowing into the intake duct 32 from a source, such as ambient or atmospheric air. Alternatively, the throttle valve 40 may be disposed downstream of the supercharger 26.

Disposed within the bypass passage 38 is a bypass valve 42, which is moved between an open position and a closed position by means of an actuator assembly, generally designated 44. The actuator assembly 44 is responsive to fluid pressure in the inlet duct 32 by means of a vacuum line 46. Actuator assembly 44 is operative to control the supercharging pressure in the discharge duct 36 as a function of engine power demand. When bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of suitable linkage. Those skilled in the art will understand that the illustration herein of the bypass valve 42 is by way of generic explanation and example only, and that, within the scope of this invention, other bypass configurations and arrangements could be used, such as a modular (integral) bypass or an electronically operated bypass, or in some cases, no bypass at all.

Figure 2:
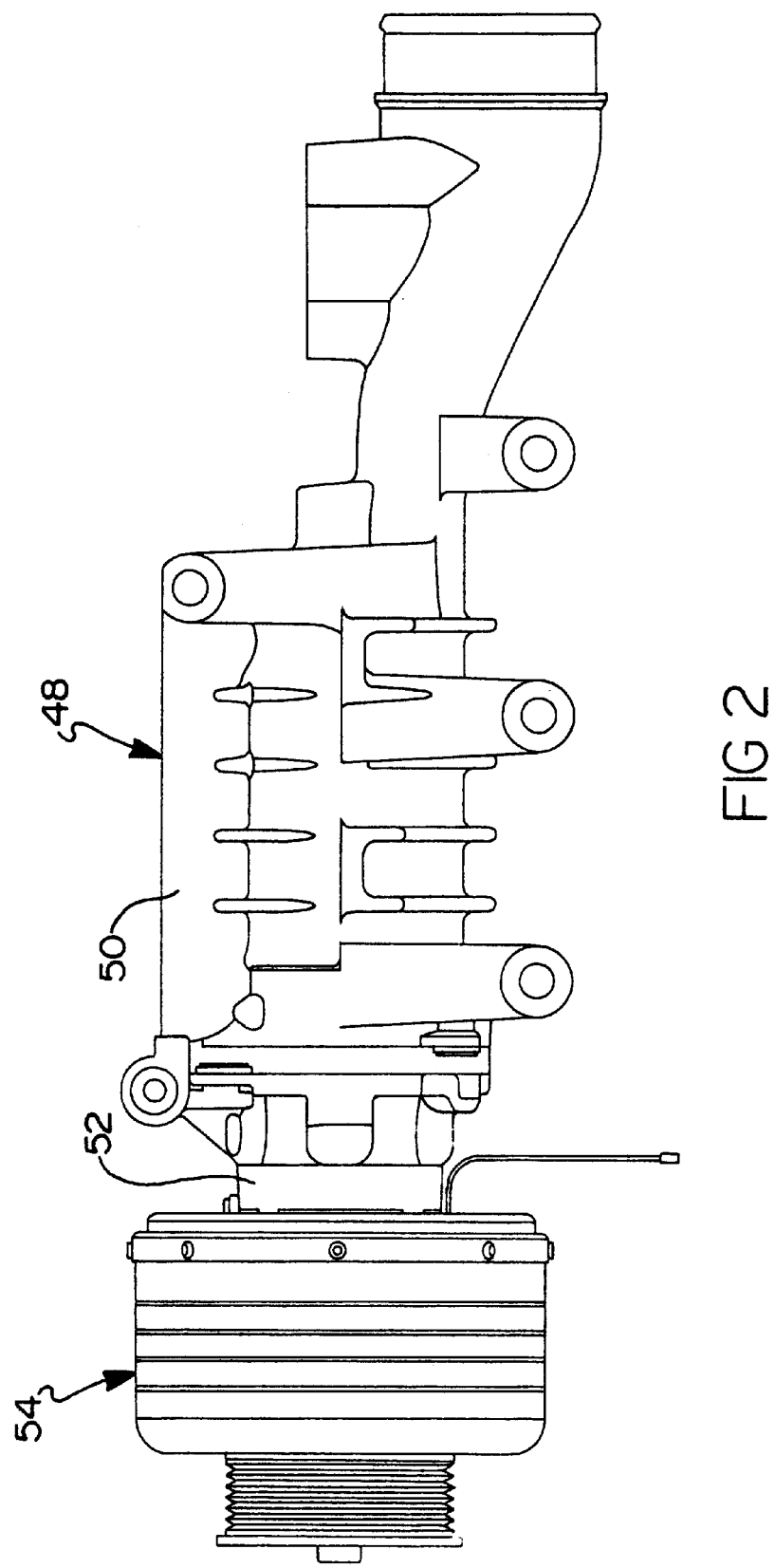
FIG. 2 is a plan view of the supercharger assembly shown schematically in FIG. 1.
Figure 3:
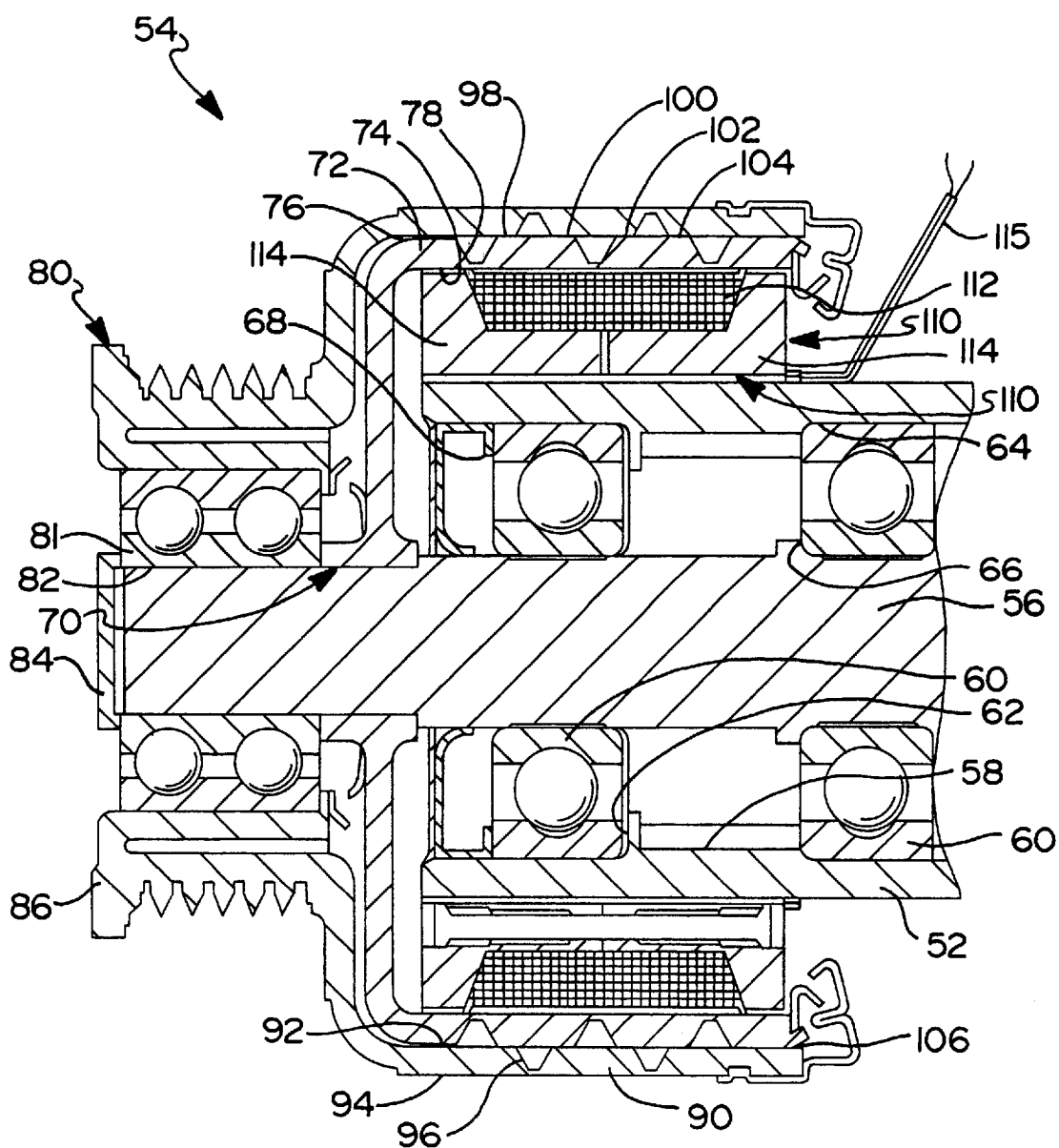
FIG. 3 is an enlarged, fragmentary, cross-sectional view of a magnetic particle clutch assembly to be controlled by the method of the present invention.

Referring to FIGS. 2 and 3, blower 26 includes a housing assembly generally designated 48, which includes a main housing 50, which defines the chambers 28c and 29c. The housing assembly 48 also includes an input housing 52, also referred to hereinafter as a clutch housing, upon which rests a portion of a clutch assembly 54. As illustrated in FIG. 3, housing 52 rotatably supports an input shaft 56 upon which another portion of the clutch assembly 54 rests.

As will be become apparent from the description herein below, operation of magnetic particle clutch 54 is based on electromagnetic and mechanical forces that act on a magnetically reactive medium disposed between multiple working surfaces of an input member and output member. The magnetic forces operate to increase the viscosity of the medium to interlock the driven and driving members. The magnetic particle clutch 54 offers many advantages, such as, inter alia, smooth engagement, the ability to operate in the slip condition, and the controllability of torque transfer over a relatively wide range of electrical input.

An exemplary magnetic particle clutch 54 for use with the present invention will be described with reference to FIGS. 3–5. Referring to FIG. 3, clutch housing 52 includes a duct 58 therethrough for receiving shaft 56. Shaft 56 is preferably supported within duct 58 by a plurality of bearings 60 that are positioned within duct 58 by shoulders 62 and 64 extending from housing 52 and shoulder 66 extending from shaft 56. At least one of bearings 60 may be further biased axially by an annular sealing member 68, as shown adjacent the leftward most bearing 60 in FIG. 3.

A first rotatable or output member 70 of known magnetic properties is fixedly secured to shaft 56. First rotatable member 70 includes a cylindrical portion 72, located radially outwardly of shaft 56, which includes an inner surface 74 and an outer surface 76. Outer surface 76 preferably includes a plurality of features 78 having non-magnetic properties. As will be described in further detail below, the non-magnetic properties of features 78 prevent lines of magnetic flux from travelling through features 78 in the presence of a magnetic field.

In the illustrated embodiment of FIG. 3, features 78 are depicted as grooves having a generally trapezoidal cross-section, but are not intended to be limited thereto. Alternatively, features 78 may comprise, for example, non-magnetic rings or slots disposed substantially or completely through cylindrical portion 72. Moreover, features 76 may be disposed on inner surface 74 or may be disposed substantially or completely through cylindrical portion 72.

A second rotatable or driving member 80 of known magnetic properties is supported on shaft 56 by a bearing 81, the position of which is determined by a shoulder 82 located on a distal end 84 of shaft 56. Disposed about a forward end of second rotatable member 80 is an integrally formed input pulley 86, by means of which torque is transmitted from an engine crankshaft (not illustrated) to the input shaft 56 during engagement of clutch 54.

Second rotatable member 80 further includes a cylindrical portion 90 located radially outwardly of cylindrical portion 72 of first rotatable member 70 and substantially parallel to shaft 56. Cylindrical portion 90 includes an inner surface 92 and an outer surface 94. Inner surface 92 preferably includes a plurality of non-magnetic features 96 substantially similar to features 78 in first rotatable member 70, but is not intended to be limited thereto. Features 96 are positioned in inner surface 92 such that features 96 are located radially outwardly of a point equidistantly between features 78 in first rotatable member 70, for reasons that will be described herein below. Features 78 on cylindrical portion 72 and features 96 on cylindrical portion 90 define therebetween a plurality of opposing working surfaces 98, 100, 102 and 104.

Figure 4A:
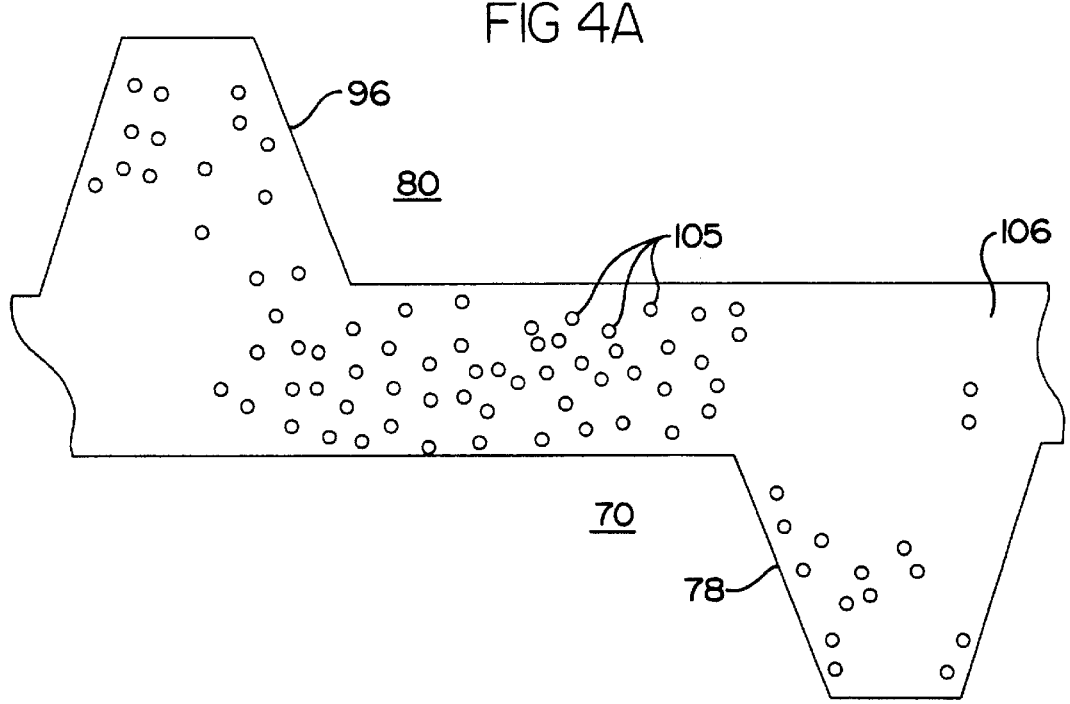
FIGS. 4A and 4B are schematic illustrations of a magnetically reactive medium during disengagement and engagement, respectively, of the magnetic particle clutch.

First rotatable member 70 and second rotatable member 80 are not in contact, but define therebetween a substantially uniform gap 106. Gap 106 exhibits a predetermined width that permits a thin layer of magnetically reactive medium 105 (as shown in FIG. 4A), such as a magnetically reactive powder, to reside therein. While a magnetically reactive powder is the preferred magnetically reactive medium due to its ability to resistant temperatures that would degrade oil based magnetorheological fluids, it is not intended to be so limited.

Figure 4B:
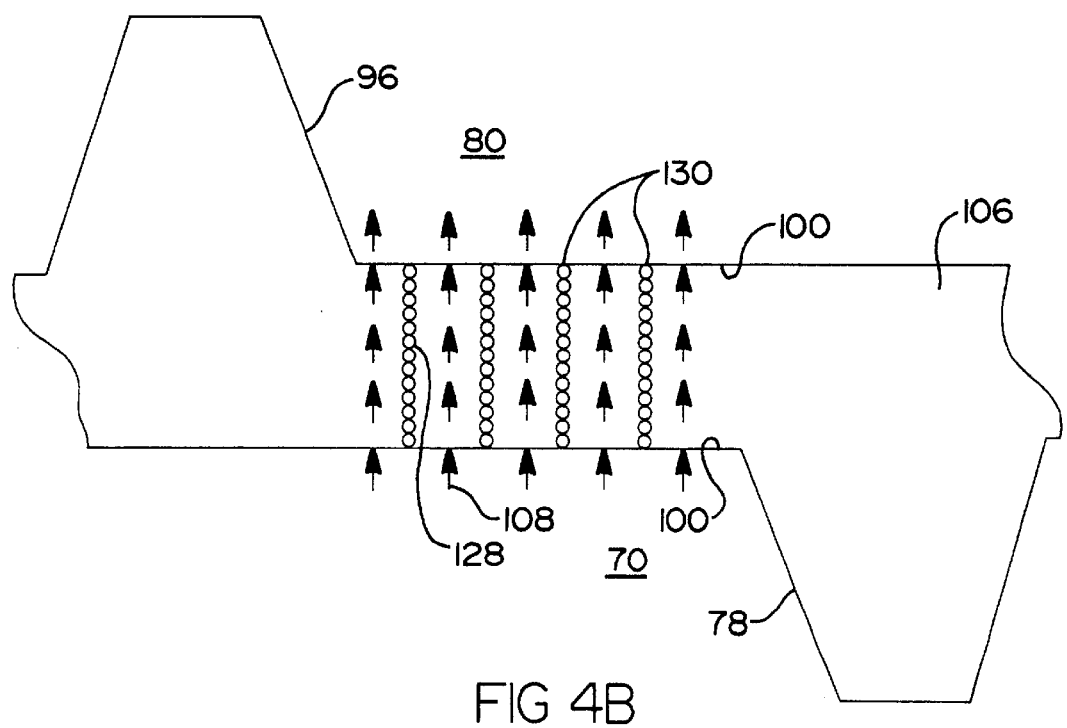

The non-magnetic properties of features 78 and 96 aid in concentrating lines of magnetic flux 108 across gap 106 and substantially through working surfaces 98, 100, 102 and 104, as illustrated in FIGS. 4B and 5, thereby advantageously increasing the working surface area of the clutch without substantially increasing clutch weight. Additionally, as illustrated in FIG. 4A, features 78 and 96 provide physical volume for receiving magnetically reactive medium 105 when no magnetic field is applied. Removing magnetically reactive medium 105 from gap 106 when no magnetic field is applied decreases friction, thereby reducing drag between first rotatable member 70 and second rotatable member 80. While the illustrative magnetic particle clutch 54 is described as having features 78 and 96, it is not intended to be so limited. Accordingly, first and second rotatable members 70, 80 may contain no non-magnetic features when additional working surface area is not required.

Clutch 54 further includes a source of magnetic flux, which is depicted in FIGS. 3 and 5 as an electromagnet 110 mounted on the outside of housing member 52 between first rotatable member 70 and housing member 52. In the illustrated embodiment, electromagnet 110 comprises a wire-wound coil 112 surrounded by a generally toroidal shell 114. As is well known, an electrical current applied to coil 112 generates a magnetic field in the vicinity of electromagnet 110, the intensity of which is proportional to the level of current provided. Alternatively, the source of magnetic flux may comprise other arrangements, such as, for example, a permanent magnet supplemented by a counteracting electromagnet so that clutch 54 will default to being engaged should the electromagnet fail.

Electromagnet 110 is controlled by an electronic control unit (ECU) (not illustrated) that provides an electrical signal to coil 112 via wires 115. The ECU processes input, such as, for example, sensor readings corresponding to vehicle parameters, and processes the input according to logic rules to determine the appropriate electrical signal to provide electromagnet 110. The ECU is preferably microprocessor based having sufficient memory to store the logic rules, generally in the form of a computer program, for controlling operation of clutch 54. It will be appreciated by those skilled in the art that the present invention is not limited to any particular type or configuration of ECU or to any specific control logic. What is essential to the present invention is that the clutch 54 communicate with some sort of control unit capable of modulating the electrical signal applied to electromagnet 110 to achieve engagement and disengagement of clutch 54 at a predetermined rate, and that the control unit include some sort of control logic capable of achieving engagement of clutch 54 at a controllable rate representative of some predetermined vehicle parameter, such as throttle position.

It is well known in the art that lines of magnetic flux 108 travel a path substantially through structures with known magnetic properties. As illustrated in FIG. 5, upon application of a magnetic field in the vicinity of electromagnet 110, lines of magnetic flux 108 exit rigid shell 114 in electromagnet 110 and traverse a gap 120, whereby flux 108 saturates areas 122 located radially inwardly of features 78 in first rotatable member 70. Upon saturation of areas 122, lines of magnetic flux 108 follow a path of least resistance and traverse gap 106, through working surfaces 124, into second rotatable member 80. The narrowest width of features 78 is best designed to be greater than the width of gap 106, thus preventing flux 108 from traversing features 78. Upon entry into second rotatable member 80, flux 108 saturates areas 126 located radially outwardly of features 96.

Upon saturation of areas 126, flux 108 traverses gap 106 through working surfaces 98, into first rotatable member 70. The process of weaving across gap 106 between features 78 and 96 is repeated until the number of features 78 and 96 is exhausted. The flux path is completed as flux 108 traverses gap 106 and gap 120 reentering rigid shell 114 of electromagnet 110.

As shown in FIG. 4B, magnetically reactive particles 128 in magnetically reactive medium 105 change formation, in relation to the intensity of the magnetic field, by aligning with the lines of magnetic flux 108 as flux 108 traverses gap 106 through working surfaces 100. Magnetically reactive particles 128 under the influence of a magnetic field will lock into chains 130 increasing the shear force and creating a mechanical friction against the working surfaces 100 facing gap 106. The increased shear force and mechanical friction result in a transfer of torque between first member 70 and second member 80.

When it is desired to operate blower 26 by engaging clutch 54, an appropriate electrical signal is transmitted to electromagnet 110 to create a magnetic field, which as described above, alters the properties of medium 105 causing a transfer of torque between second rotatable member 80 and first rotatable member 70. Referring to FIG. 6, the output torque of clutch 54 is plotted versus the current applied to electromagnet 110. As illustrated in FIG. 6, clutch 54 exhibits a nearly linear relationship between its output torque and the current applied to electromagnet 110, up to the magnetic saturation point of the clutch 54. The clutch output torque and coil current values illustrated in FIG. 6 are by way of example only, and may vary depending on factors, such as, for example, the size and number of working surfaces between rotatable members 70, 80 and operating speed of the clutch 54.

Accordingly, the amount of torque transferred between the second rotatable member 80 and the first rotatable member 70 may be selectively controlled by varying the current applied to electromagnet 110, such that a "soft engagement" may be achieved when it is desirable, or a more rapid engagement may be achieved when it is needed and acceptable. For example, when the engine is operating under a "part throttle" condition, it may be desirable to achieve a slow engagement, whereas when the engine is operating under a "full throttle" condition, it may desirable to engage the clutch more quickly. Those skilled in the art will appreciate that in most supercharger installations, it is the engagement response time that is more critical than the disengagement response time.

Figure 8:
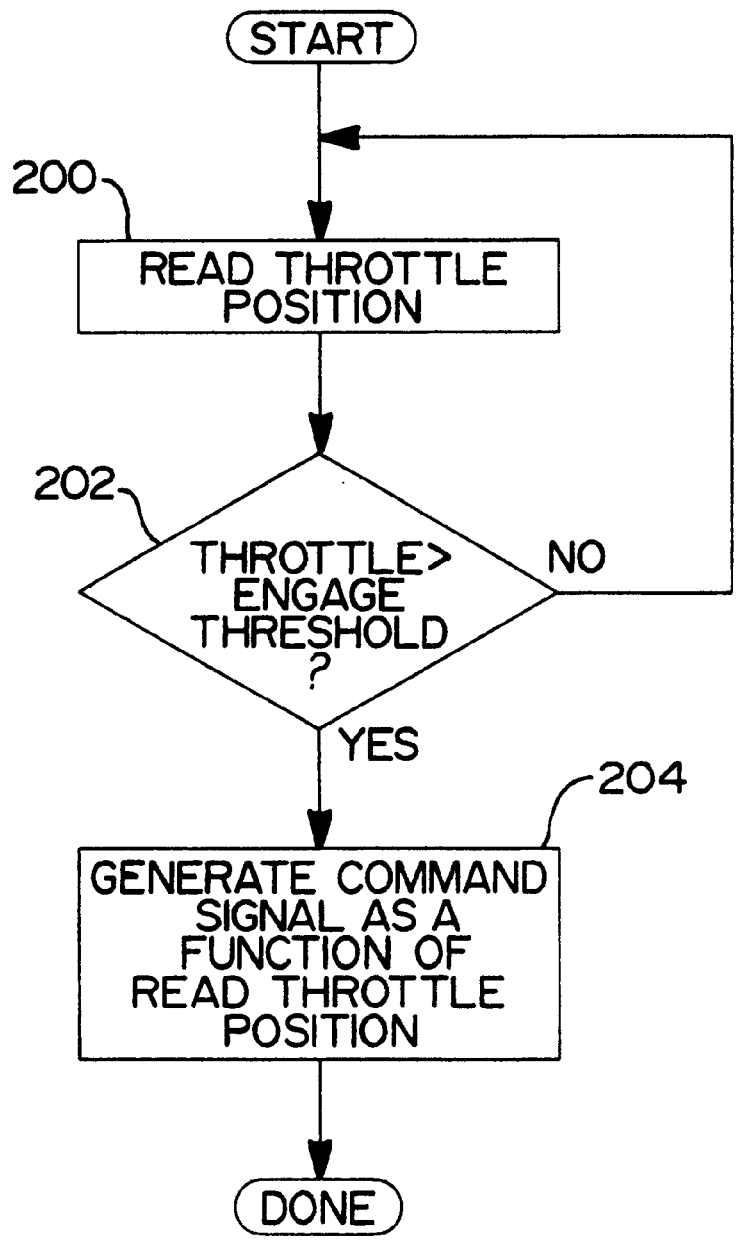
FIG. 8 is a flow diagram showing the control logic according to a preferred embodiment of the present invention.

Referring primarily to FIGS. 7 and 8, a method of controlling the engagement of the supercharger will be described in detail. By way of example only, engagement of the supercharger will be described as a function of a sensed rate of change in engine throttle position, but is not intended to be limited thereto. Alternatively, engagement of the supercharger may be controlled as a function of other sensed vehicle parameters, such as, for example, engine speed or simply throttle position.

When it is desired to operate the supercharger by engaging clutch 54, the control logic shown in FIG. 8 is initiated by proceeding to "Start". Referring to step 200, the ECU senses a rate of change in position of the throttle pedal, which is generally representative of the rate of acceleration of the vehicle. The ECU then compares the sensed rate of change in throttle position to a predetermined engagement threshold, as shown in step 202. If the engine operating parameter is less than the threshold ("No"), the logic merely loops back, upstream of step 200. If the operating parameter is greater than the threshold ("Yes"), the logic proceeds to step 204.

Referring to step 204, a command signal, representing the input current applied to electromagnet 110, is then calculated as a function of the rate of change in throttle position, as read in step 200. By way of example, the input current associated with each command signal may be applied in two parts: (1) an engagement current (I1) required to fully engage the clutch; and (2) a steady state current (I2) representing a predetermined current required to maintain the clutch 54 fully engaged.

An unlimited number of strategies for controlling engagement of clutch 54 may be generated, for example, by varying at least one of (i) the level of engagement current (I1), (ii) the rate of application of engagement current (I1) and (iii) the rate of reduction of engagement current (I1). The graph of FIG. 7 shows several exemplary control strategies for engagement of clutch 54, each control strategy corresponding to a different rate of change in throttle position, the rates of change in throttle position being labeled T1 through T4, with T1 representing a rate of change in throttle position just above a predetermined threshold value.

As illustrated in FIG. 7, the parameter T1, which corresponds to a relatively small rate of change in throttle position, results in an engagement current (I1) slowly ramping to approximately 2 amps. By contrast, the parameter T4, which corresponds to a relatively large rate of change in throttle deflection, results in the engagement current (I1) quickly increasing to approximately 6 amps. The current values illustrated in FIG. 7 are by way of example only, and will vary depending on factors, such as, for example, the type of magnetically reactive medium 105 used in clutch 54 and the magnetic saturation point of clutch 54.

As may be appreciated by the graphs of FIG. 7, the greater the magnitude and application rate of engagement current (I1), the faster the engagement of clutch 54. As was described previously, the engagement of clutch 54 is a function of the strength of the magnetic field generated by the electromagnet 110, which in turn is a function of the current applied to the coil 112. When relatively fast engagement of clutch 54 is required, the engagement current (I1) may be higher than the steady state current (I2), as illustrated in FIG. 7 for parameters T2 through T4, to overcome the inertial effects of the rotating members 70, 80 coming up to speed. When a relatively slow engagement of clutch 54 is required, the engagement current (I1) may slowly ramp toward the steady state current (I2), as illustrated in FIG. 7 for parameter T1, allowing for a smooth engagement without transient overloading of the engine 10. As will be appreciated, the signals associated with parameters T2 and T3 represent examples of a compromise between the signals associated with parameters T1 and T4.

The application rate of the input current may be controlled regardless of the level of engagement current (I1), as illustrated in FIG. 7 for parameters T2' and T2". The rate at which the input current is increased and decreased may be linear, as illustrated for parameter T2', or may exhibit other characteristics, such as, for example, an exponential increase to the engagement current (I1) and a subsequent exponential decrease to the steady state current (I2), depicted in FIG. 7 as command signal T2".

The application of input current to electromagnet 110 may also be accomplished by pulse width modulating (PWM) the electrical signal provided by the ECU. According to this method, an electrical signal having a predetermined current, for example the current corresponding to the magnetic saturation point of clutch 54, is pulsed at a predetermined frequency, which results in a lower overall mean input current being applied to the coil 112. For example, an electrical signal with a current value of 6 amps could be pulsed 50% of the time resulting in approximately one-half of the input power associated with 6 amps being applied to coil 112. As will be appreciated, pulse width modulating the engagement current (I1) reduces the maximum power input to the coil 112 resulting in a more efficient operation of clutch 54.

Under certain operating conditions, it may be desirable for the supercharger to produce a slight amount of boost that is less than the level of boost produced by the supercharger at that particular engine speed when clutch 54 is fully engaged. Because of the substantially linear relationship between the application of current and output torque of the clutch, it is possible to apply an input current to the coil 112 that permits the second rotatable member 80 to slip relative to the first rotatable member 70 resulting in clutch 54 being only partially engaged. When partially engaged, a lessor amount of torque is transferred from the second rotatable member 80 to the first rotatable member 70 than would be transferred if clutch 54 were fully engaged.

It should be understood by those skilled in the art that the particular current values and control strategies illustrated and described herein are by way of example only, and not by way of limitation. Furthermore, the engagement time, i.e., the time between application of currents (I1) and (I2), is not significant to the invention and is illustrated only as an example engagement time, the length of which may be dependent on factors, such as, for example, vehicle weight, engine horsepower, and supercharger output. By way of example only, it was found during the development of the present invention that for a rate of change in throttle position T2 (I1 equal to 4.0 amps), the result was an engagement time in the range of about 0.5 to 1.5 seconds whereas, at the other extreme, for a rate of change in throttle position T4 (I1 equal to 6.0 amps), the engagement time was in the range of about 200 to 500 milliseconds.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method of controlling a rotary blower comprising the steps of:
    (a) providing a magnetic particle clutch in driving relationship with the blower, the clutch operable to transition from a disengaged state to an engaged state;
    (b) sensing at least one vehicle parameter; and
    (c) generating a signal operable to engage the clutch in response to the sensed vehicle parameter, wherein the transition from a disengaged state to an engaged state is a function of the sensed vehicle parameter.

2. The method according to claim 1, wherein the step of generating a signal is performed as a function of a change in the sensed vehicle parameter.

3. The method according to claim 1, wherein the step of sensing a vehicle parameter comprises sensing a throttle position.

4. The method according to claim 3, wherein the throttle position is representative of a change in commanded throttle position.

5. The method according to claim 1, wherein the step of sensing a vehicle parameter comprises sensing a rate of change in a throttle position.

6. The method according to claim 1, wherein the step of sensing a vehicle parameter comprises sensing an engine speed.

7. The method according to claim 1 further including the step of modifying the signal to maintain the clutch in the engaged state.

8. The method according to claim 1, wherein the generating step comprises generating a signal having an input current that transitions from an engagement level operable to engage the clutch to a steady state level operable to maintain the clutch in the engaged state.

9. The method according to claim 8, wherein the engagement level is greater than the steady state level.

10. The method according to claim 1, wherein the generating step further comprises pulse width modulating the signal.

11. The method according to claim 1, wherein the step of providing a magnetic particle clutch comprises providing a magnetic particle clutch that includes an input member, an output member and a source of magnetic flux, the input and output members each including a plurality of non-magnetic features positioned to force the magnetic flux to travel a path substantially between the features transforming a magnetically reactive medium disposed between the input and output members into a torque transmitting coupling causing the clutch to transition from the disengaged state to the engaged state.

12. The method according to claim 11, wherein the torque transmitted between the input member and the output member is substantially proportional to the signal.

13. A control system for controlling operation of a rotary blower comprising:

a magnetic particle clutch in driving relationship with the blower, the clutch operable to transition from a disengaged state to an engaged state;

at least one sensor for sensing a vehicle parameter;

a control unit operable to selectively communicate a signal to the clutch in response to the sensed vehicle parameter causing the clutch to engage; and wherein the transition from said disengaged state to said engaged state is a function of the sensed vehicle parameter.

14. The control system of claim 13, wherein the control unit includes logic rules effective for:

(a) sensing a vehicle parameter; and (b) generating a signal operable to engage the clutch.

15. The control system of claim 13, wherein the vehicle parameter comprises at least one of throttle position, engine speed and rate of change in throttle position.

16. The control system of claim 13, wherein the transition from the disengaged state to the engaged state will occur more rapidly for a more rapid change in the vehicle parameter.

17. The control system of claim 13, wherein the signal exhibits an input current that transitions from an engagement level operable to engage the clutch to a steady state level operable to maintain the clutch in the engaged state.

18. The control system of claim 17, wherein the engagement level is greater than the steady state level.

19. The control system of claim 17, wherein the input current quickly ramps to an engagement level greater than the steady state level.

20. The control system of claim 17, wherein the input current slowly ramps to an engagement level substantially equal to the steady state level.

21. The control system of claim 17, wherein the engagement level is greater than the steady state level for rapid changes in the sensed vehicle parameter.

22. The control system of claim 17, wherein the engagement level is approximately a magnetic saturation point of the clutch for relatively rapid changes in the sensed vehicle parameter.

23. The control system of claim 13, wherein the signal provided by the control unit is pulse width modulated.

24. The control system of claim 13, wherein clutch includes an input member, an output member and a source of magnetic flux, the input and output members each including a plurality of non-magnetic features positioned to force the magnetic flux to travel a path substantially between the features transforming a magnetically reactive medium disposed between the input and output members into a torque transmitting coupling causing the clutch to transition from the disengaged state to the engaged state.

25. The control system of claim 24, wherein the torque transmitted between the input member and the output member is substantially proportional to the signal.

26. A method of controlling a rotary blower comprising the steps of:

(a) providing a magnetic particle clutch in driving relationship with the blower, the clutch operable to transition from a disengaged state to an engaged state;

(b) sensing at least one vehicle parameter; and (c) generating a signal operable to engage the clutch in response to the sensed vehicle parameter, the step of generating the signal is performed as a function of the rate of change of the sensed vehicle parameter, wherein the transition from a disengaged state to an engaged state is a function of the sensed vehicle parameter.

27. The method according to claim 25, wherein the transition between the disengaged state and the engaged state will occur more rapidly for a more rapid change in the vehicle parameter.

* * * * *